United States Patent

[11] 3,552,738

[72] Inventors Bernhard Hettich
Villingen;
Heinrich Kammerer, Neuhausen; Friedrich Fleck, Villingen, Germany

[21] Appl. No. 818,525
[22] Filed Apr. 23, 1969
[45] Patented Jan. 5, 1971
[73] Assignee Kienzle Apparate GmbH
Villingen, Germany
[32] Priority Apr. 24, 1968
[33] Switzerland
[31] No. 6077/68

[54] APPARATUS FOR PROCESSING CARDS HAVING PRINTED AND RECORDED DATA
12 Claims, 7 Drawing Figs.

[52] U.S. Cl. ........................................................ 271/3
[51] Int. Cl. ........................................................ B65h 5/22
[50] Field of Search ............................................ 209/72, 73, 74, 111—7, 111—8; 271/3

[56] References Cited

UNITED STATES PATENTS 3,028,956 4/1962 Phelau et al. .................. 209/72
3,207,505 9/1965 Nielsen et al. ................ 271/3

*Primary Examiner*—Allen N. Knowles
*Attorney*—Michael S. Striker

ABSTRACT: Under the control of a computer and a keyboard, a selected card with printed and recorded data, is read out and then held in a card storage station while correlated cards are read out, imprinted, and discharged, whereupon the card is transported from storage station to the printing station for receiving data derived from the correlated cards.

INVENTORS:
BERNHARD HETTICH
HEINRICH KAMMERER
FRIEDRICH FLECK
By: Michael S. Striker
Attorney INVENTORS:
BERNHARD HETTER
HEINRICH KAMMEIER
FRIEDRICH FLECK
By: Michael S. Striker
Attorney

INVENTORS

BERNHARD HETTICH
HEINRICH KAMMERER
FRIEDRICH FLECK

By Michael S. Striker
Attorney

APPARATUS FOR PROCESSING CARDS HAVING PRINTED AND RECORDED DATA

BACKGROUND OF THE INVENTION

The invention relates to an apparatus for processing record carriers, hereinafter referred to as "cards" which have a printing portion for imprinted legible data, and a recording portion, preferably including a magnetizable layer or an adhesively attached piece of magnetic tape which can be read out by a readout head. Apparatus of this type are used together with an electronic computer which combines read out data with additional data, and then records the new information on the cards. The magnetizable portion of the cards may have recordings representing the number of a specific account, and also the address of the respective customer so that it is possible to read out the account cards for printing the heading of an invoice form or account statement.

Apparatus according to the prior art includes one or several input stations for the cards, a readout station, a printing station, and one or several receptacles for processed and discharged cards. The cards are transported from the input station to the readout station so that the data recorded on the magnetizable portion are stored in the computer. During the continued feeding of the card from the readout station to the printing station, the data read out at the readout station can be combined with additional data by the computer so that the cards can be imprinted at the printing station with the already read out data, and also with new data computed by the computer. After passage through the printing station, the cards are discharged. Such an arrangement is, for example, described in the U.S. Pat. No. 3,028,956.

It is also known to transport cards selectively along different paths and to provide routing means or mechanical switch means which can be shifted between different positions for guiding cards selectively to one path or to another path. In one arrangement of this type, selected cards are routed to the printing station, while other cards, for example account cards in whose accounts no change has taken place, are shunted to another path away from the printing station and discharged into a receptacle.

Data processing apparatus according to the prior art is incapable of partly processing a certain card, and to complete the processing of the card after correlated cards have been processed.

SUMMARY OF THE INVENTION

It is one object of the invention to overcome these disadvantages of data processing apparatus according to the prior art, and to provide a more versatile data processing apparatus.

Another object of the invention is to provide an apparatus with a card storage station in which particular cards can be held in a waiting position, while other cards are being processed, whereupon the waiting card is transported to the printing station and/or a recording station for receiving information and data derived from the other correlated cards.

Another object of the invention is to provide apparatus in which information concerning the customer is read out from the account card of the customer, whereupon the account card is stored, and article cards related to the customer account card are processed so that information derived from the article cards can be entered on the customer account card, and information derived from the customer account card can be entered on the article cards.

With these objects in view, an apparatus according to the invention comprises an input station for cards, a readout station including a readout head, and first transporting means for transporting cards along a first path from the input station to the readout station; a printing station, and second transporting means for transporting cards from the readout station to the printing station along a second path; a card storage station including third transporting means for transporting cards along a third path to a waiting position; and routing means having a normal position for guiding selected cards from the first path to the second path, and a storing position for guiding a selected card from the first path to the third path for storage at the storage station.

Control means are provided which include data processing programmed computer means electrically connected with the readout head, operation control means for moving the routing means between the normal and storing positions, and feed control means for driving the first, second, and third transporting means selectively in forward feeding and reverse feeding directions.

Under the control of the computer means hose programming means preferably include manually operated keys, a selected card, for example a customer account card, can be stored at the card storage station while other correlated cards, for example article cards concerning articles ordered by the customer, are transported along the first and second paths and processed at the readout and printing stations. After the processed article cards have been discharged by reversing of the second and first transporting means, the customer account card is transported to the printing station by reversal of the second and third transporting means and shifting of the routing means so that the customer account card can be provided with data derived from the processed article cards. During the printing of the article cards and of the customer account cards, an invoice form can be simultaneously imprinted, and shows a total which is also entered on the customer account card.

The use of the apparatus of the invention with a customer account card and correlated article cards has been described only by way of example, and it is evident that the apparatus can be used for other data processing operations in which it is advantageous to hold one card stored in a waiting position, while other cards are being processed. The apparatus can be used for any transaction in which a part of data recorded on a record carrier must be read out before other record carriers are processed, and the same must be imprinted or receive new recorded information derived from the other record carriers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Card Feed Control Station

Figure 2:
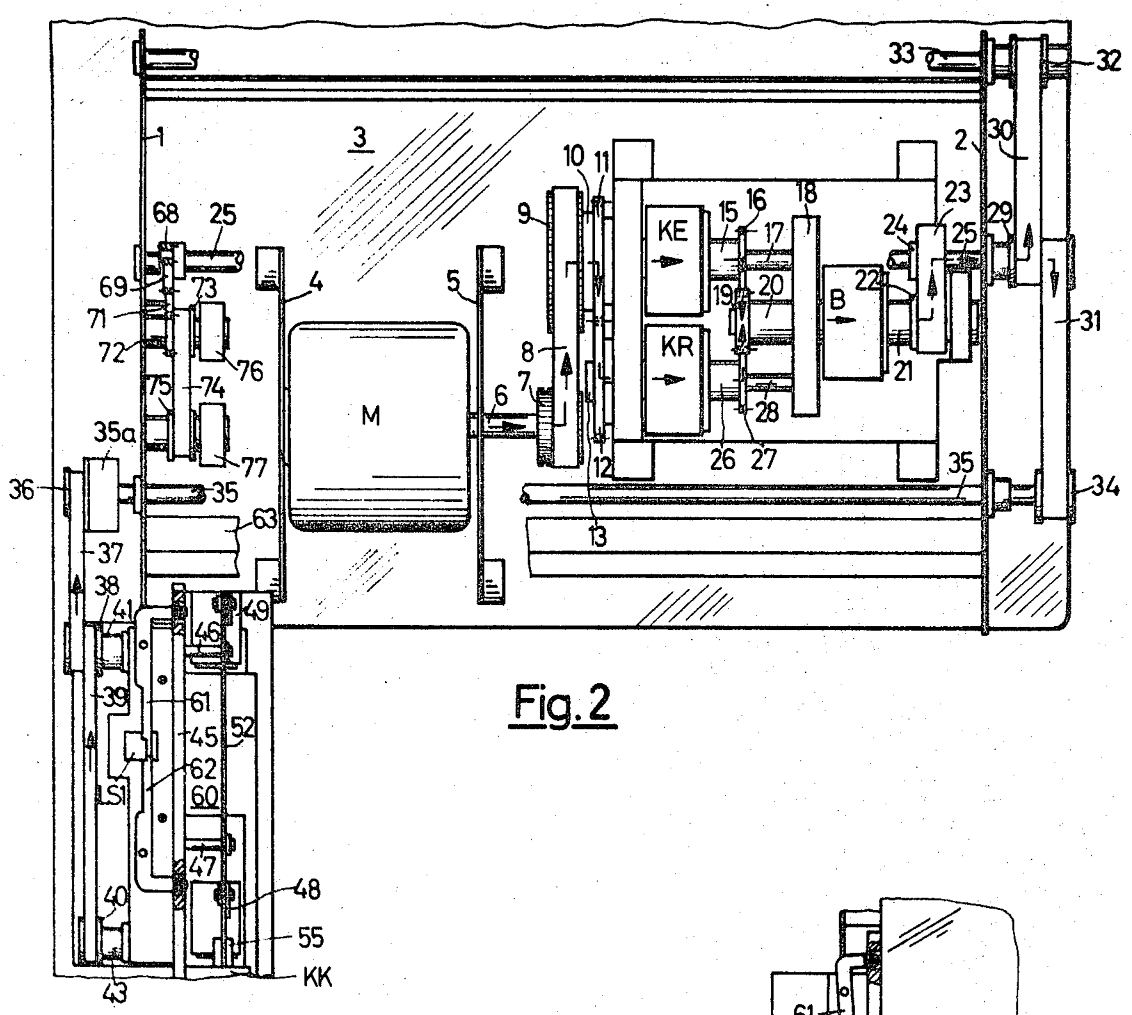
FIG. 2 is a fragmentary schematic plan view illustrating feed control means and the input station of the embodiment of FIG. 1.

The apparatus is mounted on a support structure between walls 1 and 2 which are secured to a base plate 3 carrying a motor M between bracket walls 4 and 5. As best seen in FIG. 2, the output shaft 6 of motor M is mounted in a bearing in wall 5 and drives a toothed pulley 7 connected by a toothed belt 8 with another toothed pulley 9. Pulley 9 drives a shaft 10 with a fixed gear 11 meshing with a gear 12 carried by shaft 13. A support wall has bearings for shafts 10 and 12 which drive the input parts of an electromagnetic card feed clutch KE and of a card reverse feed clutch KR whose output parts are respectively connected with shafts 15 and 26 which drive gears 16 and 27 meshing with a central gear 19. Shaft portions 17 and 28 of shafts 15 and 26 are mounted in bearings in a support wall 18 through which another shaft 20, connected with gear 19, passes to drive the input parts of an electromagnetic brake B mounted on the extension 21 of shaft 20. When the electromagnetic brake B is energized, shafts 20 and 21 with gear 19 are stopped since the other part of brake B is fixedly secured to the supporting structure. When brake B is not energized, shaft means 20, 21 is driven by gear 19 which is driven in opposite directions of rotation when card feed clutch KE or card reverse feed clutch KR is energized. Clutches KE and KR are selectively energized by a control circuit which includes means by which electromagnetic brake B is energized and actuated when none of the clutches KE and KR is energized. On the other hand, when electromagnetic brake B is not energized, at the same time either card feed clutch KE or card reverse feed clutch KR is energized. Shaft 21 drives a pulley 22 which is connected by a belt 23 and another pulley 24 with a card feed control shaft 25.

When card feed clutch KE is energized, the card feeding means are driven from motor M by means of shaft 6, pulleys 7 and 9, shaft 15, 17, gears 16 and 19, shaft 20, 21, pulleys 22, 24 and shaft 25 in a card feeding direction so that an inserted account card is transported to a printing station.

When the card reverse feed clutch KR is energized, motor M drives card feed control shaft 25 in a reversed direction of rotation by means of pulleys 7 and 9, gears 11 and 12, clutch KR, gears 27 and 19, shaft 20, 21, and pulleys 22 and 24. The transmission of force is schematically indicated by arrows in FIG. 2.

Card Input and Positioning Station

Card feed control shaft 25 is mounted in bearings of walls 1 and 2 and carries a double pulley 29 driving two belts 30, 31 by which a pulley 32 connected with a shaft 33, and a pulley 34 connected with a shaft 35 are driven. Shafts 33 and 35 are also mounted in bearings of support walls 1 and 2. A free portion of shaft 35 drives a pulley 36 through a one-way clutch **35*a* only in the card feed direction. Pulley 36 drives another pulley 38 over a belt 37. Pulley 38 is a double pulley and drives another belt 37 passing over another pulley 40**.

Figures 1, 3:
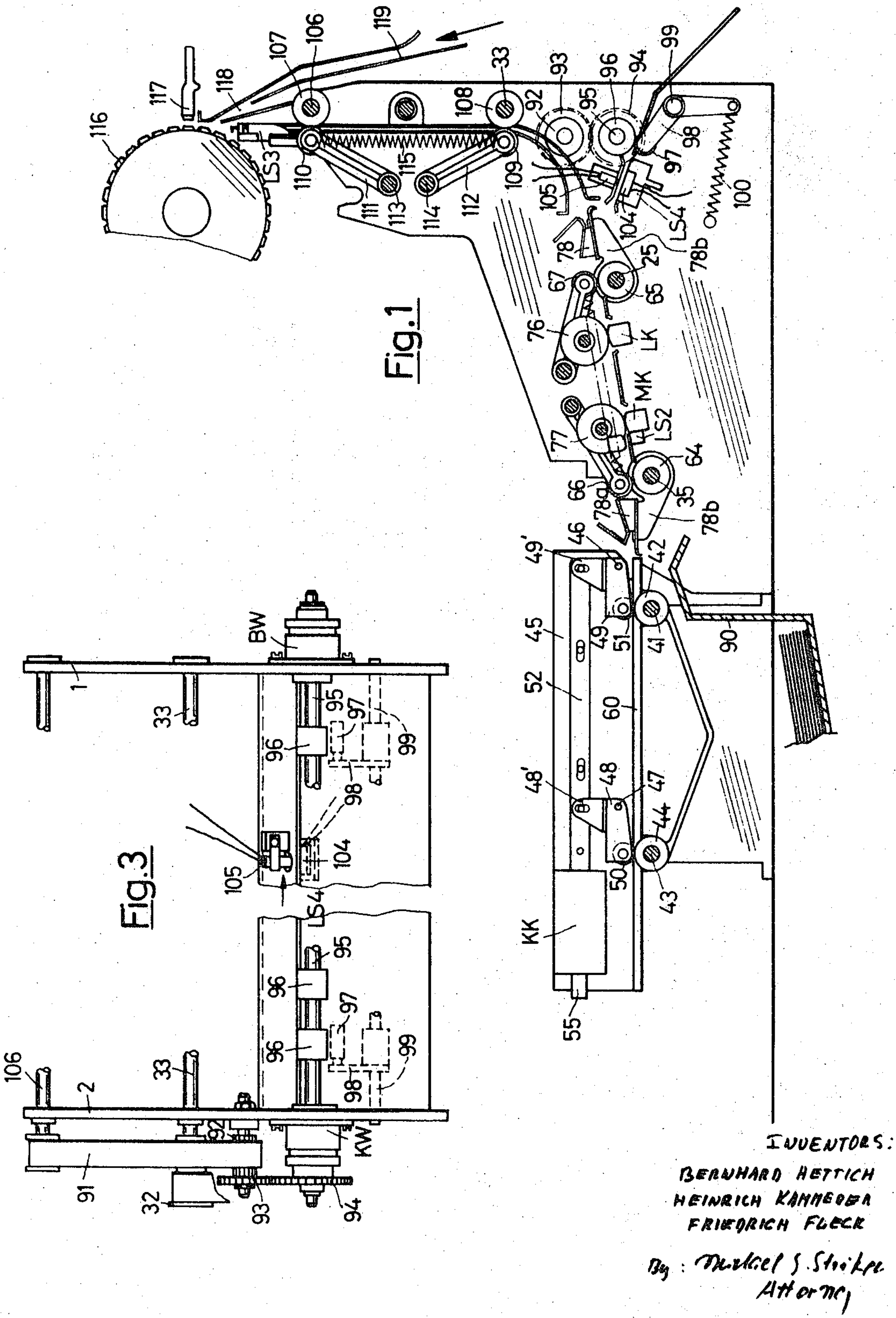
FIG. 1 is a schematic side elevation, partially in section, illustrating an embodiment of the invention.
FIG. 3 is a fragmentary schematic front elevation illustrating the card storage station of the embodiment of FIG. 1.

Pulley 38 is secured to a shaft 41, see also FIG. 1, which carries the drive roller 42 of a pair of transporting rollers 42, 51. Pulley 40 is connected with a shaft 43 which carries the drive roller 44 of another pair of transporting rollers 44, 50. A vertical support wall 45 carries pivots 46, 47 on which carriers 49, 48 are mounted for angular movement with pressure rollers 50 and 51. Carriers 48, 49 are angular levers having arms 48', 49' connected to a bar 52 by a pin and slot connection. Bar 52 has slots guided on pins which are secured to wall 45 so that bar 52 performs a rectilinear movement when actuated by the armature 55 of a card feed clutch KK. A spring, not shown, biases bar 52 toward the right as viewed in FIG. 1 so that the pairs of transporting rollers 44, 50 and 42, 51 are normally inoperative until card feed clutch KK is energized and effects turning of carrier levers 48, 49, and movement of pressure rollers 50, 51 toward drive rollers 44, 42.

Motor M and feed control shaft 25 can drive transporting rollers 52, 44 over shaft 35, and pulleys 36, 38, 40 only in the feeding direction, since the one-way clutch **35*a* prevents reverse feeding. If electromagnetic brake B is not energized, but card feed clutch KE is energized, transporting rollers 42, 44 are driven. An account card placed on the card table 60 is transported by the transporting rollers 44, 50 and 42, 51 only after card feed clutch KK has been energized and moved pressure rollers 50, 51** to an operative position so that the account card is gripped between the transporting rollers.

Card table 60 forms one arm of a rectangular profile whose other arm is the vertical guide wall 45 which serves for orienting one edge of an account card placed on table 60. The lines of engagement of the pairs of transporting rollers 42, 51 and 44, 50 are located at the level of the top face of table 60. Directly above table 60, two feeler levers 61 and 62 are mounted for angular movement whose outer end portions project into openings in wall 45, while the inner adjacent end portions of sensing levers 61, 62 cooperate with a light barrier LS 1.

When an account card 63, see FIG. **2*a*, is placed on card table 60 and oriented and positioned by engagement of its edge with positioning guide wall 45, its edge slightly displaces the feeler portions of feeler levers 61, 62 so that the inner end portions of the same actuate light barrier actuate light barrier LS 1 to produce an impulse. In the position of FIG. 2, in which no card is pushed against positioning wall 45, the feeler portions at the outer ends of feeler levers 61, 62 slightly project out of the openings in positioning wall 45. Only if both sensing levers 61, 62 are angularly displaced by a card, light barrier LS 1** generates a starting impulse.

Readout Station

After an account card has been oriented and positioned on table 60, drive rollers 42 and 44, if driven from feed control shaft 25 in the feeding direction, transport the card through first routing means **78*a* to drive rollers 64 and 65 and pressure rollers 66 and 67. Drive roller 64 is carried by shaft 35, and drive roller 65 is carried by shaft 25, see FIG. 2. Shaft 25 drives a transmission including gears 68, 69, 71, 72, a pulley 73 connected by a the toothed bolt belt 74 with a pulley 75. Pulleys 73 and 75 are connected with pressure rollers 76 and 77 which press the card against a readout head MK and a clearing head LK, respectively, see FIG. 1. A second light barrier LS 2 is arranged between the readout head MK and turn transporting rollers 64, 66 and checks the presence or absence of a card at the readout station. After passage of a card through the readout station, it passes through a second routing means 78. The first and second routing means 78 and 78*a* are angularly displaced an angle of 180°, but are otherwise of identical construction. The functions of routing means 78 and 78*a* will now be explained only for o routing means 78, which is shiftable between two positions shown in FIGS. 4*a* and 4*b*** for routing the card to different stations.

Routing means 78 has a lower guide plate 79 and an upper guide plate 80 connected with each other by bent lateral portions 81, 82. Lateral portion 82 of guide plate 79 is pivotally connected with the armature 83 of a first routing electromagnet WEI.

Figure 4A:
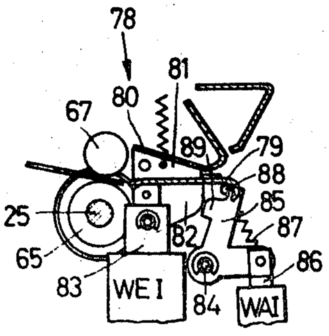
FIGS. 4*a* and 4*b* illustrating a routing means of the embodiment of FIG. 1 in two operational positions.

An angular arresting pawl 85 is mounted on a stationary pivot 84 and has one arm articulated to the armature 86 of a second smaller routing electromagnet WAI. A spring 87 is also connected to the armature and to a stationary stud 88 so that the other arm of arresting pawl 85 abuts stud 88 under the action of spring 87. Pawl 85 has an arresting portion 89 cooperating with the horizontal edge of guide plate 79 so that, when the first routing electromagnet WEI is energized, parts 79 to 82 turn with arm **78*b* about shaft 25, see FIG. 1, until pawl 85 engages the edge of guide plate 79 and arrests routing means 78 in the position shown in FIG. 4*b*. In the position of FIG. 4*a*, the second routing electromagnet WAI receives a short energizing pulse so that pawl 85 is turned out of the arresting position of FIG. 4*b*, and moves to the inoperative position shown in FIG. 4*a* in which a spring, not shown, turns routing means 78 from the post position of FIG. 4*b* to the position of FIG. 4*a***.

As noted above, the routing means **78*a* operates in the same manner, but guide plates 79, 80 turn with arm 78*b* about shaft 35**.

Figure 4B:
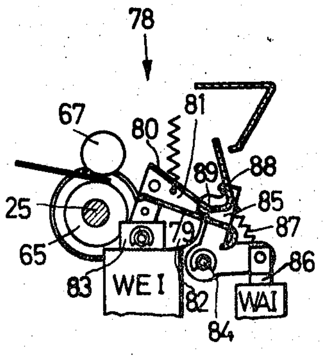

In the position shown in FIG. **4*a*, the routing means 78 serves as a mechanical switch to route a card 63 from the readout station to the printing station. In the position of FIG. 4*b*, the routing means 78 routes card 63 to a card storage station where the card waits until it is again needed. Routing means 78*a* in the normal position shown in FIG. 1 routes the card from the positioning station and transporting rollers 42, 51 to the readout station, and if routing means 78***a* is turned to a post position corresponding to the position shown in FIG. 4*b* for routing means 78, it routes a card from the readout station, which is at the same time a recording station, into a receptacle 90 located below the input station. The manner in which a card is returned from the printing station through the readout and recording station to routing means 78*a* under the control of the card reverse feed clutch KR and feed control shaft 25 will be explained hereinafter.

Card Storage Station

The card storage station is shown at the lower right corner of FIG. 1 and in FIG. 3. As explained with reference to FIG. 2, feed control shaft 25 drives a shaft 33 by a pulley and belt transmission 29, 30, 32. As shown in FIG. 3, shaft 33 drives a toothed belt 91 rotating a toothed pulley 92 connected with a gear 93 meshing with another gear 94 which is connected by an electromagnetic storing clutch KW with a shaft 95 carrying drive rollers 96 cooperating with pressure rollers 97 which are mounted on lever arms 98 turnable about shafts 99 and are urged by springs 100 into engagement with drive rollers 96. The end portion of shaft 95 passes through a bearing in support wall 1 and is connected with the rotary part of an electromagnetic brake BW whose stationary part is secured to wall 1.

When storing clutch KW is energized, gear 94 is coupled with shaft 95 so that shaft 95 and drive rollers 96 are driven from shaft 33. When a card is routed by routing means 78 in the position of FIG. 4*b* to the card storage station, transporting rollers 96, 97 transport the card until a control impulse is transmitted to the electromagnetic brake BW under the control of a further light barrier LS 4 disposed at the card storage station, see FIG. 1. Light barrier LS 4 includes a source of light 105 and a photo diode 104, see FIG. 3. When light barrier LS 4 senses no card at the inlet of the card storage station, a pulse is generated by which electromagnetic brake BW is energized to stop shaft 95, while electromagnetic storing clutch KW is disconnected so that shaft 95 and driving transporting rollers 96 are no longer driven, and can be stopped by brake BW.

Printing Station

Referring again to FIGS. 1 and 3, a shaft 106 is also driven from shaft 33 by means of a belt 91 passing over a pulley on shaft 106. Driving transporting rollers 107 and 108 are secured to shaft 106 and 33, respectively, and cooperate with pressure rollers 110 and 109. When routing means 78 is in the normal position shown in FIGS. 1 and 4*a*, the card is transported by transporting rollers 108, 109 and 107, 110 to the printing station including a printing cylinder 116 provided with circumferential types, and printing hammers 117 which respectively cooperate with the types.

Pressure rollers 109 and 110 are rotatably carried by lever arms 111, 112 which respectively turn about shafts 113 and 114 and are biased by springs 115 to engage the driving rollers 107, 108.

Shortly before the card reaches the printing position located between printing cylinder 116 and printing hammers 117, it passes through a further light barrier LS 3 which senses the position of the leading edge of the card, and produces a pulse which serves to control the adjustment of the card to a printing position in which a correct line is imprinted.

A card chute 118 is provided for guiding a band 119 consisting of interconnected forms, such as invoice forms, to an imprinting position located between printing cylinder 116 and printing hammers 117. The invoice forms 119 and account cards 63 are to be placed in superimposed positions or preferably side by side between printing cylinder 116 and printing hammers 117 so that the invoice form and the card 63 are simultaneously or subsequently imprinted with characters represented by selected types of printing cylinder 116 when hammers 117 are operated.

Control Circuit

Figure 5:
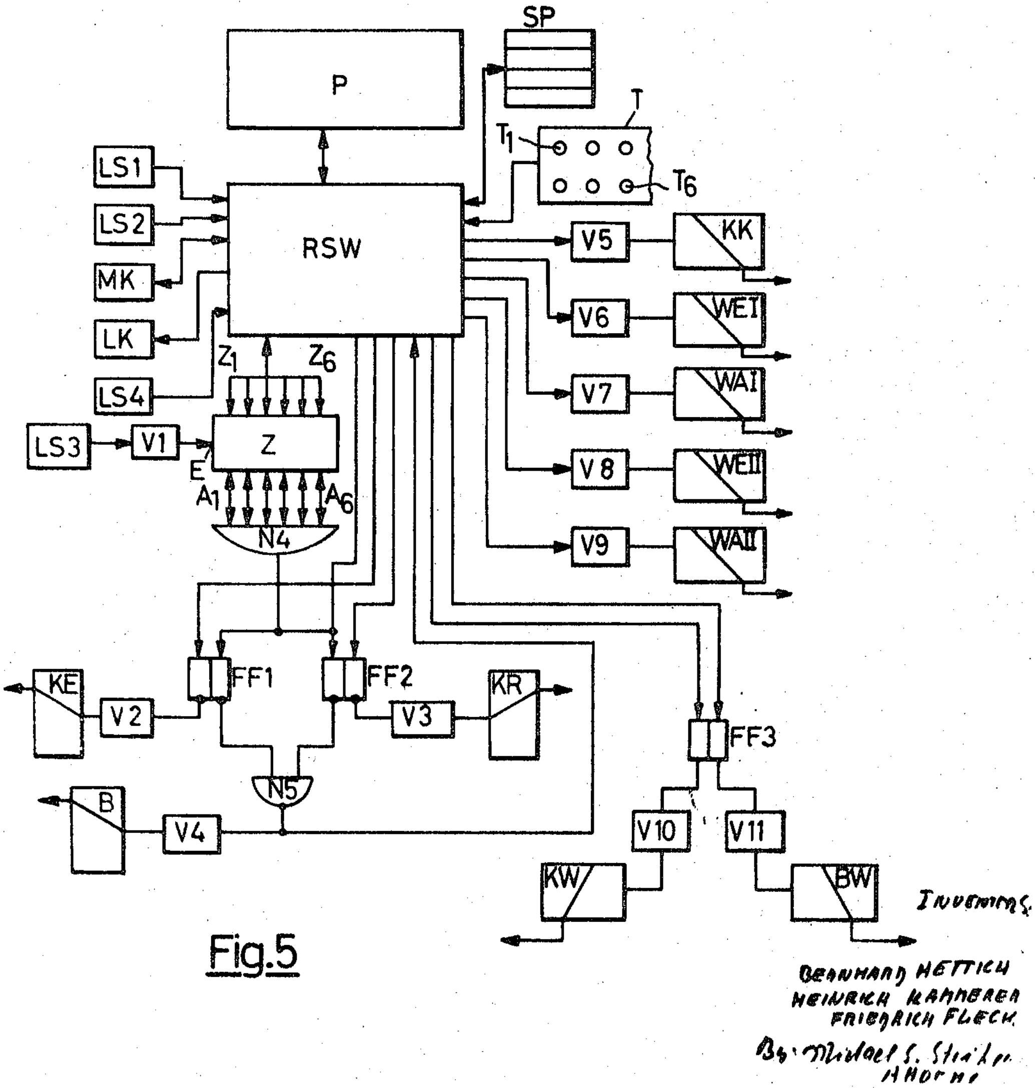
FIG. 5 is a schematic illustration of the electrical circuit.

Referring now to FIG. 5 which schematically illustrates the electric circuit of the apparatus, and the electric connections between the several parts of the same, a data processing computer RSW operates in accordance with a program provided by programming means P. An electronic storage means SP has any desired number of storing members which serve not only for storing certain information supplied by the cards, but also for storing intermediate data during the processing of the data, or other similar functions. A keyboard T with any number of required keys, including keys $T_1$ to $T_6$, is connected with computer RSW, and serves as manual input for information. FIG. 5 further shows the above described card feed clutch KK, the first and second routing electromagnets WEI and WAI of routing means 78, and first and second routing electromagnets WEII and WAII of the routing means 78*a* which are connected by means of amplifiers V 5 to V 9 with computer RSW to receive amplified energizing impulses from the same. The light barrier LS 1 of the card positioning station, see FIG. 2*a*, the light barrier LS 2 of the readout station, and the light barrier LS 4 of the card storage station are directly connected with computer RSW, while light barrier LS 3 is connected over an amplifier V 1 with a binary counter Z. The readout and recording head MK and the clearing head LK are also connected with the computer RSW.

Counter Z is a six order binary counter, and can count up to 63. Six presetting lines Z 1 to Z 6 connect counter Z with computer RSW. Lines Z 1 to Z 6 serve the purpose of presetting counter Z to a predetermined value required for printing in the correct lines. Counter Z has an input E for the pulses generated by the light barrier LS 3, and six output lines $A_1$ to $A_6$ are connected by an AND gate N 4 with two flip-flops FF 1 and FF 2 and switch flip-flop FF 1 to the position "O L" and flip-flop FF 2 to the position "L O" when all output lines A 1 to A 6 transmit a "L" signal. The left input of flip-flop FF 1 and the right input of flip-flop FF 2 are respectively connected with the computer RSW. The left output of flip-flop FF 1 is connected by amplifier V 2 with the card feed clutch KE, and the right output of flip-flop FF 2 is connected by amplifier V 3 with the reverse feed clutch KR. The right output of flip-flop FF 1 and the left output of flip-flop FF 2 are both connected with an AND gate N 5 which is connected by an amplifier V 4 with an electromagnetic brake B.

Another flip-flop FF 3 has inputs connected with computer RSW and two outputs respectively connected by amplifiers V 10 and V 11 to storing clutch KW and storing brake BW. Flip-flop FF 3 assures that either the storing clutch KW or the storing brake BW are energized at any time.

OPERATIONS

Feeding and Printing

The account cards 63 have recordings not only representing information, but also recorded control data such as the indication of the next line which is to be read out. Furthermore, the magnetic recording portion of the card also contains alpha numerical data, such as the address of the respective customer, the number of the article sold, and the price of the same.

Figure 2A:
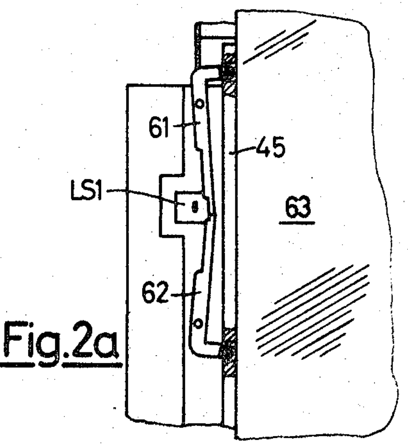
FIG. 2*a* is a fragmentary plan view illustrating a part of the input station.

The card is placed on card table 60, see FIGS. 1, 2, 2*a* at the positioning station, and oriented and properly positioned by engagement of its lateral edge with wall 45. In the correct position of card 63, feeler levers 61, 62 cause generation of a pulse by the light barrier LS 1 which is transmitted to the computer RSW which, in cooperation with the programming means P, starts the feeding of the card by effecting switching of flip-flop FF 1 by which the card feed clutch KE, see FIG. 2, is energized so that the card is transported through routing means 78*a* into the readout station which comprises light barrier LS 2, readout and recording head MK, clearing head LK and pressure rollers 76, 77. Light barrier LS 2 controls the switching on and switching off of the magnetic heads MK and LK.

During a normal processing operation of the card 63, routing means 78*a* and 78 are in the normal positions so that the card is transported past the magnetic heads MK and LK and to a position located between the printing types of the printing cylinder 116 and the hammers 117. At this moment, light barrier LS 3 is actuated and generates a pulse transmitted to counter Z which causes stopping of the cards in the correct line position. Since this function is not an object of the invention, it is sufficient to state that card 63 has a recorded mark for each line which are counted in binary counter Z which was previously set to the complementary value of the desired line number. When the counter Z is at the end of its capacity, pulses are transmitted through all output lines $A_1$ to $A_6$ so that the AND gate N 4 is actuated and flip-flop FF 1 is switched from a condition in which its left part was conductive to a position in which its right part is conductive so that the right output of flip-flop FF 1 produces a pulse transmitted to the AND gate N 5. Since flip-flop FF 2 was conductive on the left, the AND gate N 5 is switched so that feed brake B is energized and stops feed control shaft 25, and all transporting rollers driven from the same so that the card is stopped in the correct line position, and can be imprinted.

Card Delivery

When the printing of the card is completed, the card must be discharged. For this purpose, storage means SP stores information regarding the last line, which is changed for each movement of the account card in the printing station, which means that whenever the card is shifted to the next line, the stored line information was corrected in storage means SP. When the programmed calculation operation has been completed, programming means P transmit a signal to computer RSW which transmits the command signal "discharge card" to flip-flop FF2 so that its right part becomes conductive, and its left part nonconductive. As a result, reverse feed clutch KR is energized, the direction of rotation of feed control shaft 25 is reversed, transporting rollers 107 and 108 are driven in the opposite direction, and the card is transported from the printing station through routing means 78 and the readout station to routing means 78*a*. Since the computer RSW also transmits a signal through amplifier V 8 to the first routing magnet WEII of the routing means 78*a*, the same has assumed a discharge position in which the card is discharged downward into the card receptacle 90. Due to routing means 78*a*, the card cannot be transported onto the card table 60, but due to the provision of the one-way clutch 35*a* between the reversed feed control shaft 25 and transporting drive rollers 42, 44, the same are stopped anyway. The magnetic head MK is controlled by the computer RSW to record the newly computed and printed value on the magnetic portion of the card during passage of the same through the readout station. At the same time, the corrected line information, taken from storage means SP, is also recorded.

Card Storing and Printing

The card can be guided into the storing station including rollers 96, 97 by two different operations. Either a selected key of keyboard T is operated to select a specific subprogram, in which event the respective program key T1 to T6 has to be actuated before the card, which is to be transported to the card storage station, is placed on the card table 60 and effects actuation of the start light barrier and rotation of feed control shaft 25 causing feeding of the card. On the other hand, it is also possible to provide the cards with corresponding control marks on the magnetic record carrier portion so that, when these guiding marks are read out by the magnetic head MK, the card is guided and transported into the card storage station. The last mentioned operation starts with placing of card 63 on card table 60 in the position of FIG. 2*a* so that light barrier i LS 1 generates a start signal causing energization of feed magnet KK so that pressure rollers 50 and 51 press the card on card table 60 against the drive rollers 44, 42. A new signal is then transmitted from programming means P to the computer RSW by which flip-flop FF 1 is switched to a condition in which its left portion is conductive so that card feed clutch KE is energized so that transporting rollers 42, 44, 64, 65, 107 and 108 are driven and the card is transported. Routing means 78*a* is in the normal feeding position so that the card passes through the light barrier LS 2 which effects connection of the magnetic head MK. When the same reads out a mark on the card representing the information "card storage," the first routing electromagnet WEI is energized so that routing means 78 is turned from the position shown in FIG. 4*a* to the position shown in FIG. 4*b* for guiding the card into the card storage station.

When the first routing electromagnet WEI is energized, flip-flop FF 3 is switched from the position in which its right part is conductive, and storing brake BW was energized, to the position in which its left part is conductive so that the storing clutch KW, see also FIG. 3, is energized whereby shaft 95 with transporting rollers 96 is driven. The card moves through routing means 78 which is in the position of FIG. 4*b*, passes through the light barrier LS 4, and interrupts the current in light barrier LS 4 when the same is passed by the leading edge of the cards. After passage of the card through light barrier LS 4, a pulse is transmitted from programming means P and computer RSW to the flip-flop FF 3 so that the right side of the same becomes conductive and storing brake BW is energized so that the storing transporting rollers 96, 97 stop, while the storing clutch KW is simultaneously disconnected so that the card is clamped between the transporting roller 96 and the pressure roller 97 and arrested at the card storage station in a waiting position. Guide means, as schematically indicated in FIG. 1, are provided for guiding and supporting the card at the card storage station.

The signal produced by light barrier LS 4 when the trailing edge of a card has passed through light barrier LS 4 is transmitted to the computer RSW and the programming means P so that the apparatus is ready for the processing of the next card. When another card is placed on the card table and aligned with wall 45, it is processed as described under the headings "Feeding and Printing" and "Card Delivery." After the desired entries have been made on the new card and other cards following the same, while at the same time parts of the entered values are also printed on the invoice form 119, it may be necessary to transport the card waiting at the card storage station to the printing station. In this case, it is always necessary to operate a key of keyboard T since no information can be stored in the programming em means regarding the unknown number of cards which were fed to the printing means while one card was held at the card storage station. A key is provided at keyboard T which, when operated, activates a subprogram of programming means P so that computer RSW generates a signal by which flip-flop FF 3 is switched to the position in which its left side is conductive so that storing clutch KW is energized. At the same time, flip-flop FF 2 must be switched to the position in which its right side is conductive so that the card reverse feed clutch KR is energized whereby drive rollers 64, 65, and also 96, 107 and 108 are driven in a reversed direction so that the card is transported out of the card storage station and to the readout station. When the now trailing edge of the card has past light barrier LS 4, flip-flops FF 2 and FF 3 are switched over so that flip-flop FF 3 disconnects the storing clutch KW and energizes the storing brake BW so that the transporting and holding rollers 96, 97 of the card storage station are stopped. The signal generated by light barrier LS 4 also effects switching of flip-flop FF 2 to the position in which its left part is conductive, and since flip-flop FF 1 is conductive on the right side, and the AND gate N 5 energizes feed brake B. A signal is fed back to the computer RSW so that in accordance with the selected subprogram, the second routing magnet WA I of routing means 78 is energized so that routing means 78 is turned back to its normal position shown in FIG. 4*a*. At the same time, a signal is transmitted to flip-flop FF 1 for switching the same to the position in which its left side is conductive so that the card feed clutch KE is energized, and the card is transported by transporting rollers 65, 67, 108, 109 and 107, 110 to the printing position located at the printing station between the printing types of printing cylinder 116 and the printing hammers 117.

The discharge of the card is carried out as described above for cards supplied at card table 60, and the card is discharged into receptacle 90 due to the fact that the routing means 78*a* has been turned to guide the card transported in the reverse direction downward and under the card table 60. However, it is also possible to leave routing means 78*a* in the normal position, with the feeding rollers 42, 44 not running and the pressure rollers 50, 51 unclutched and to guide the returned card to the top surface of card table 60, if separation of customer account cards from article cards is desired.

Card Processing

Assuming that the customer has ordered five different articles or items, the specific card assigned to the customer, as well as the cards representing information regarding each article, must be processed. The customer's card must receive the information regarding the transactions with the five articles, the article cards must receive recorded information regarding the transactions in the respective articles, and an invoice must be printed.

The above described apparatus is capable of processing the cards in this manner. First, the customer account card is fed at the input and positioning station to the apparatus, and the address of the customer is read out from the magnetic portion of the customer card, and printed on an invoice form 119 by printing means 116, 117. The state of the account of the customer is stored in storage means SP, whereupon the customer card is transported to, and held waiting at the card storage station by storage transporting rollers 96, 97.

Thereupon the five article cards are successively fed to the apparatus, and when each article card passes the readout station and magnetic head MK, the identification number of the article, the number of articles in storage, and the price of each article is read out from the magnetic record carrier portion of the article card, while the keyboard T is operated to supply the computer RSW with the information regarding how many pieces of the article were ordered. The data processing computer RSW calculates the total price of the sold number of articles for each article card, and also prints this information on the invoice form 119. At the same time, the number of the sold articles is printed on each article card so that the accounts on the same are up to date.

When the cards are transported for from the printing station back to the readout station upon reversing of the transporting means, the magnetic record carrier of each article card receives corresponding recorded information from magnetic head MK which serves as a recording head. When all five article cards have been processed in this manner, while the invoice was printed, a key of keyboard T is operated so that the customer card is transported from the card storage station to the printing station so that the completed data taken from all article cards can be entered on the customer card, which means that the customer account can be debited with the total amount of the invoice. When the customer card is transported through the readout station on its way back to the receptacle 90, the new total is recorded on the magnetic record carrier portion of the customer card so that the same is ready for the next processing operation.

It will be understood that each of the elements described above, or two or more together, may also find a useful application in other types of card processing apparatus differing from the types described above.

While the invention has been illustrated and described as embodied in a card processing apparatus having a card storage in which a customer card is held during the processing of several article cards whereupon information derived from the article cards is recorded and printed on the customer card, it is not intended to be limited to the details shown, since various modifications and structural changes may be made without departing in any way from the spirit of the present invention.

We claim:

1. Apparatus for processing cards having a portion for receiving printed data and a recording portion for receiving recorded data, comprising, in combination, an input station for cards, a readout station including a readout head, and first transporting means for transporting cards from said input station along a first path past said readout head; a printing station, and second transporting means for transporting cards from said readout station to said printing station along a second path; a card storage station including third transporting means for transporting cards along a third path to a waiting position; routing means having a normal position for guiding selected cards from said first path to said second path, and a t storing position for guiding a selected card from said first path to said third path for storage at said storage station in said waiting position; and control means including data processing programmed computer means electrically connected with said readout head, operation control means for moving said routing means between said normal and storing positions, and feed control means for driving each of said first, second, and third transporting means selectively in forward feeding and reverse feeding directions so that a selected card can be stored at said card storage station while other correlated cards are transported along said first and second paths and processed at said readout and printing stations, whereupon said selected card is transported to said printing station.

2. Apparatus as claimed in claim 1 wherein said routing means is located between said readout means and said printing means.

3. Apparatus as claimed in claim 1 wherein said third transporting means include a pair of storing transporting rollers, and wherein said selected card in said waiting position is held by said pair of storing transporting rollers between the same.

4. Apparatus as claimed in claim 1 wherein said third transporting means include a pair of storing transporting rollers, wherein said card storage station includes a light barrier crossing said third path, and including means for transmitting a signal to said computer means when passed by a selected card so that said feed control means stops said pair of storing transporting rollers in a position in which said selected card is clamped in said waiting position between said storing transporting rollers.

5. Apparatus as claimed in claim 4; said control means including means controlling said computer means so that said operation control means shift said routing means from said normal position to said storing position when a selected card is supplied to said input station; and wherein said light barrier controls said computer means by said signal so that said operation control means move said routing means from said storing position to said normal position so that other cards can be transported along said first and second paths to said printing station.

6. Apparatus as claimed in claim 1 wherein a selected card in said waiting position is held by said third transporting means; and wherein said feed control means include a motor, and an electromagnetic storing clutch controlled by said computer means and connecting said motor with said third transporting means; and comprising a brake for stopping and arresting said third transporting means when said storing clutch is disengaged.

7. Apparatus as claimed in claim 1, said control means including programming means controlling said computer means so that said operation control means shifts said routing means from said normal position to said storing position when a selected card supplied to said input station moves along said first path; wherein said card storage means includes a light barrier crossing said third path and including means for transmitting a signal to said computer means when passed by a selected card, said signal controlling said computer means so that said operation control means move said routing means from said storing position to said normal position so that other cards correlated with said selected card can be transported along said first and second paths to said printing station while the selected card is in said waiting position.

8. Apparatus as claimed in claim 7 wherein said programming means include a manually operated key for selecting a specific subprogram for actuating said operation control means to shift said routing means from said normal position to said storing position when said key is actuated upon supplying of a selected card to said input station.

9. Apparatus as claimed in claim 7 wherein said recording portion of said selected cards has a recording which is read out at said readout station by said readout head for producing a signal transmitted to said computer men means for selecting a subprogram for actuating said operation control means to move said routing means from said normal position to said storing position.

10. Apparatus as claimed in claim 7 wherein said programming means include a manually operated key for selecting a specific subprogram for said computer means so that at least said third and second transporting means transport the selected card from said storing station to said printing station when said key is actuated after processing of said other correlated cards.

11. Apparatus as claimed in claim 10 wherein upon actuation of said key, said programming means controls said computer means, said operation control means and said feed control means so that said routing means is shifted from said normal position to said storing position, and said third and first transporting means are reversed for transporting the selected card in the reverse feeding direction from said card storage station through said routing means to said readout station, whereupon said routing means is again shifted from said storing position to said normal position and said first and second transporting means are operated in the forward feeding direction for transporting said selected card from said readout station to said printing station.

12. Apparatus as claimed in claim 11 wherein said third transporting means include a pair of storing transporting rollers, wherein said card storage station includes a light barrier crossing said third path, and including means for transmitting a signal to said computer means when passed by a selected card so that said feed control means stops said pair of storing transporting rollers in a position in which said selected card is clamped in said waiting position between said storing transporting rollers; and wherein said light barrier controls said computer means by said signal so that said operation control man means move said routing means from said storing position to said normal position so that other cards can be transported along said first and second paths to said printing station.